(12) United States Patent
Noble

(10) Patent No.: US 9,618,143 B2
(45) Date of Patent: Apr. 11, 2017

(54) POWER CORD CONTROLLER

(71) Applicant: Jack Noble, Sedro Woolley, WA (US)

(72) Inventor: Jack Noble, Sedro Woolley, WA (US)

(73) Assignee: Nifty Tools, LLC, Sedro Woolley, WA (US)

( * ) Notice: Subject to any disclaimer, the term of this patent is extended or adjusted under 35 U.S.C. 154(b) by 0 days.

(21) Appl. No.: 14/788,400

(22) Filed: Jun. 30, 2015

(65) Prior Publication Data

US 2016/0018024 A1    Jan. 21, 2016

Related U.S. Application Data

(63) Continuation-in-part of application No. 29/496,801, filed on Jul. 17, 2014.

(51) Int. Cl.

| | |
|---|---|
| *A47B 96/06* | (2006.01) |
| *F16L 3/223* | (2006.01) |
| *F16M 13/02* | (2006.01) |
| *F16L 3/24* | (2006.01) |
| *H02G 3/30* | (2006.01) |
| *H02G 3/04* | (2006.01) |

(52) U.S. Cl.
CPC .............. *F16L 3/2235* (2013.01); *F16L 3/24* (2013.01); *F16M 13/022* (2013.01); *H02G 3/30* (2013.01); *H02G 3/0431* (2013.01)

(58) Field of Classification Search
CPC . F16L 3/13; F16L 3/127; F16L 55/035; F16L 3/237; F16L 3/24; B60R 11/00; B60R 2011/0071; F16F 15/04; F16B 1/00; F16M 13/022; H02G 3/30; H02G 3/0431

USPC ........ 248/49, 68.1, 214, 215, 301; 211/60.1, 211/70.8

See application file for complete search history.

(56) References Cited

U.S. PATENT DOCUMENTS

| | | | |
|---|---|---|---|
| 254,333 A * | 2/1882 | Kane | ..................... F16L 3/2235 248/301 |
| 887,272 A | 5/1908 | Robinson | |
| 1,334,545 A | 3/1920 | Londelius, Jr. | |
| 1,472,955 A | 11/1923 | Behringer | |
| D138,739 S | 9/1944 | Harris | |
| 3,360,229 A | 12/1967 | Beyer | |
| D228,737 S | 10/1973 | Mathews | |
| D261,960 S | 11/1981 | Mathews | |
| 4,431,152 A * | 2/1984 | Reed, Jr. | .............. H02G 3/0683 248/65 |
| D285,529 S | 9/1986 | Huxhold et al. | |
| D297,110 S | 8/1988 | Zagorski | |
| D297,412 S | 8/1988 | Allen | |
| 4,775,121 A * | 10/1988 | Carty | .................... F16L 3/2235 24/543 |

(Continued)

*Primary Examiner* — Gwendolyn Baxter
(74) *Attorney, Agent, or Firm* — Schacht Law Office, Inc.; Dwayne Rogge

(57) ABSTRACT

Disclosed herein is a cord control system in several embodiments used to support, separate, and organize power cords including: industrial grade power cords, cables, air hoses, open conduit including; vacuum hoses, oxygen hoses, welding leads, welding hoses, water hoses, data cables, cables, webbing, ropes, etc. Several examples of the cord control system has an optional cord retaining strap which secures and supports multiple cords of optionally varying types on a single cord control rack by utilizing multiple cord receivers.

7 Claims, 5 Drawing Sheets

(56) References Cited

U.S. PATENT DOCUMENTS

| | | | |
|---|---|---|---|
| 4,799,641 A * | 1/1989 | Koreski | F16L 3/2235 |
| | | | 24/329 |
| 4,878,586 A | 11/1989 | Bancroft et al. | |
| D323,286 S | 1/1992 | Roetting | |
| D336,421 S | 6/1993 | Grubicy et al. | |
| D342,938 S | 1/1994 | Cheatham | |
| D394,600 S | 5/1998 | McCoy et al. | |
| D404,010 S | 1/1999 | Viklund et al. | |
| D404,364 S | 1/1999 | Viklund et al. | |
| D407,963 S | 4/1999 | Gretz et al. | |
| D439,503 S | 3/2001 | Paliga et al. | |
| D439,828 S | 4/2001 | Kiely et al. | |
| 6,241,200 B1 * | 6/2001 | Camporeale | F16L 3/223 |
| | | | 248/68.1 |
| D463,253 S | 9/2002 | Canty | |
| 6,458,104 B2 * | 10/2002 | Gautsche | A61B 19/10 |
| | | | 128/DIG. 26 |
| D468,996 S | 1/2003 | Sarkinen et al. | |
| D534,060 S | 12/2006 | Kiely | |
| 7,438,265 B2 | 10/2008 | Urzua | |
| D580,661 S | 11/2008 | Belokin | |
| D582,686 S | 12/2008 | Belokin | |
| D612,225 S | 3/2010 | Forte | |
| D640,527 S | 6/2011 | Hoek | |
| D666,896 S | 9/2012 | Pinholster et al. | |
| D668,130 S | 10/2012 | Pawluk | |
| 8,840,071 B2 | 9/2014 | Oh et al. | |
| D719,103 S | 12/2014 | Liang et al. | |
| D728,349 S | 5/2015 | Lake | |
| D747,113 S | 1/2016 | Goodman et al. | |
| D755,043 S | 5/2016 | Bailey | |
| D769,198 S | 10/2016 | Sajedian | |

\* cited by examiner

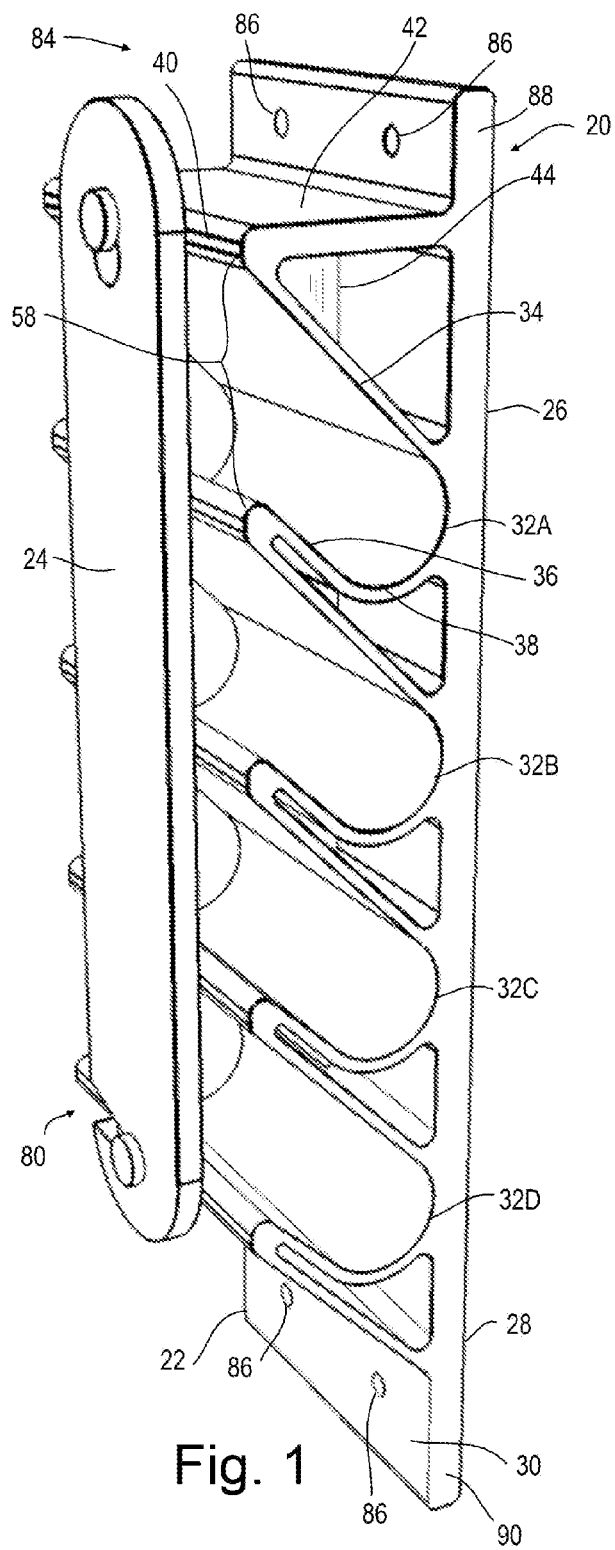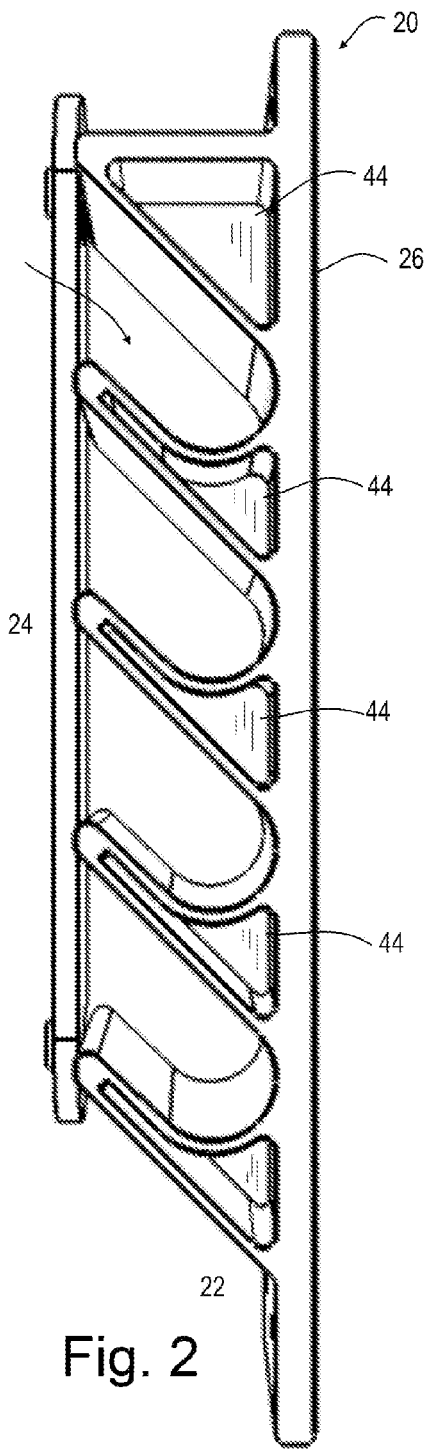
Fig. 1
Fig. 2

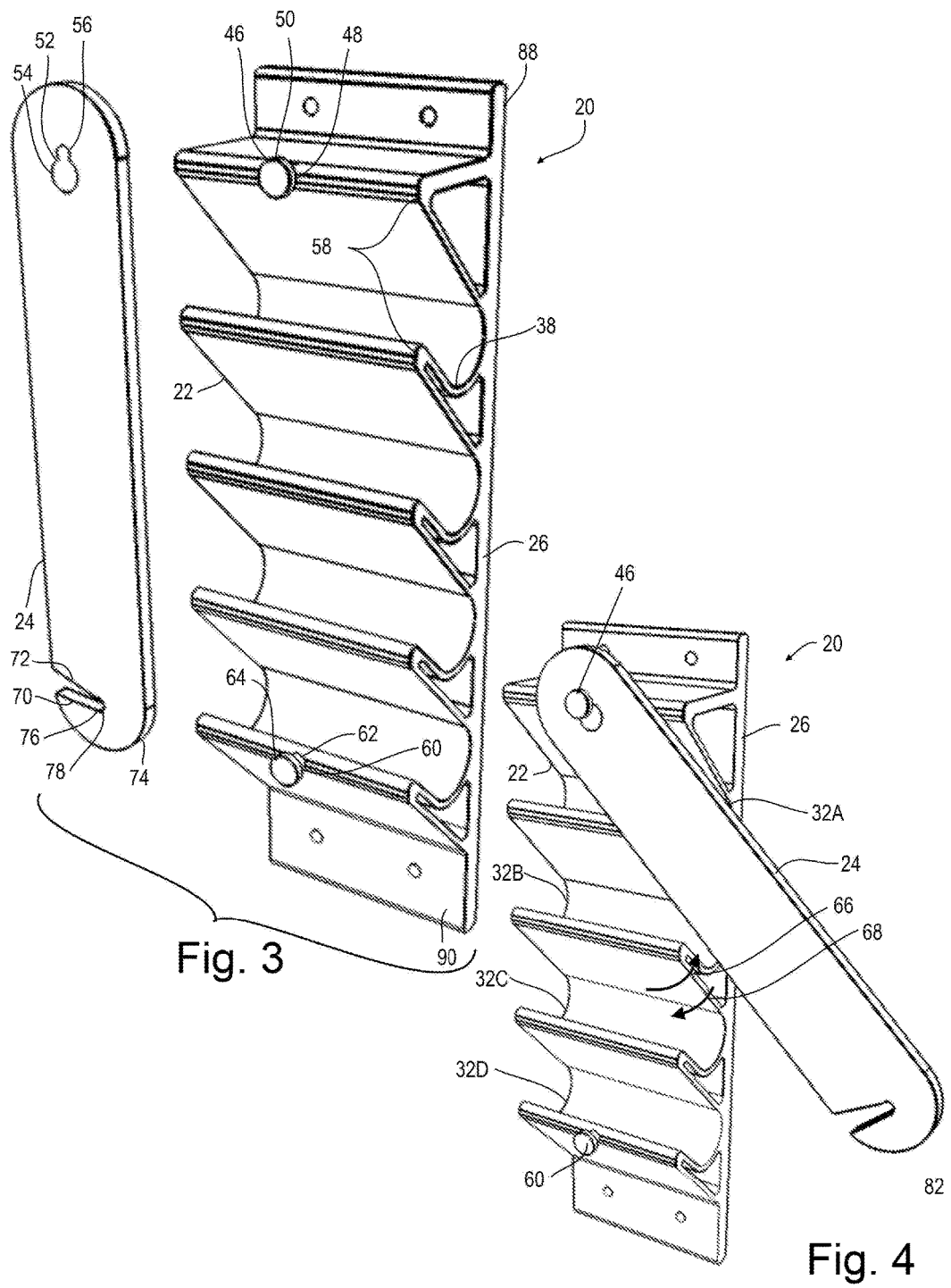

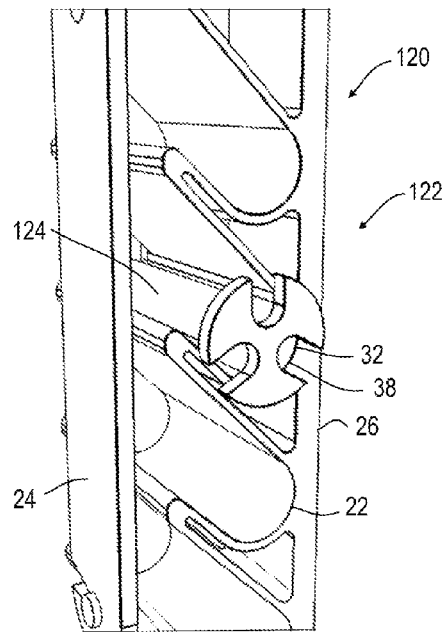
Fig. 5
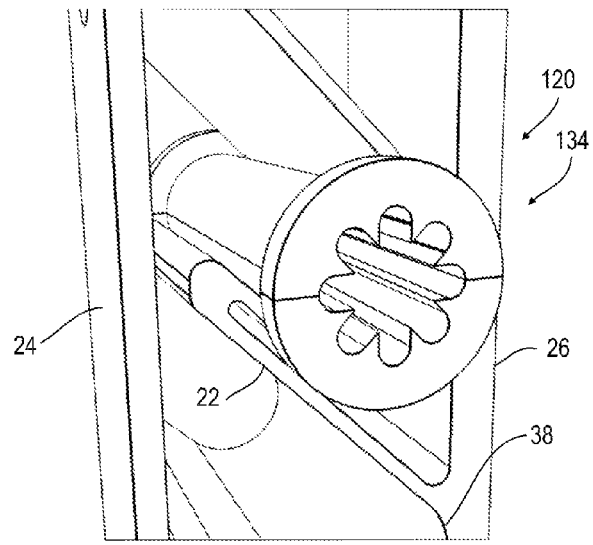
Fig. 7
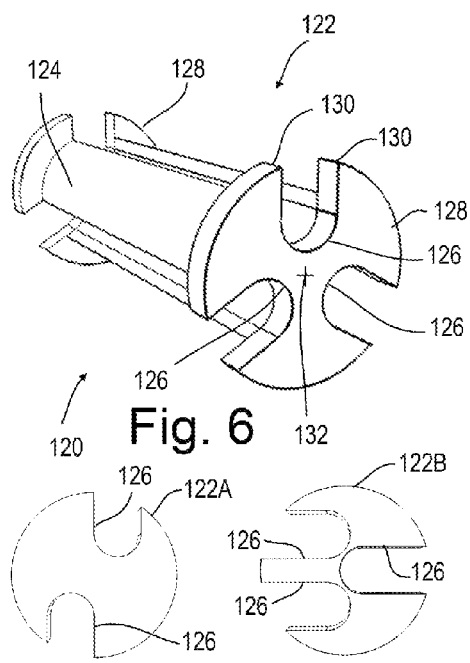
Fig. 6
Fig. 6A   Fig. 6B
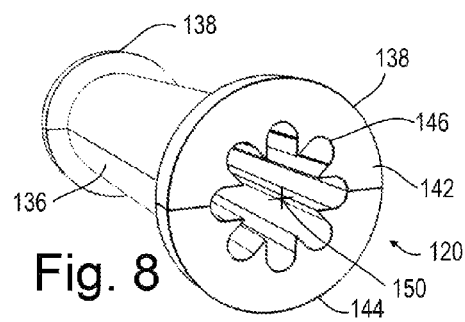
Fig. 8
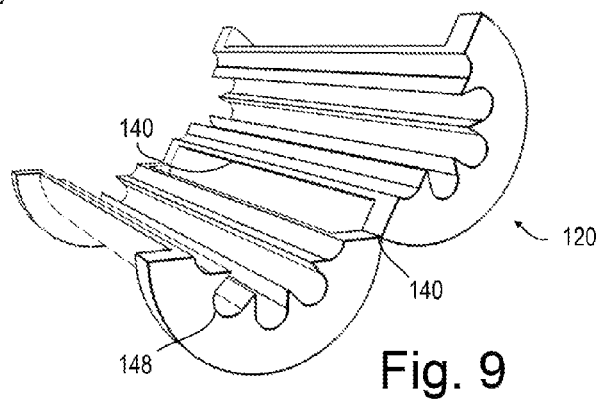
Fig. 9

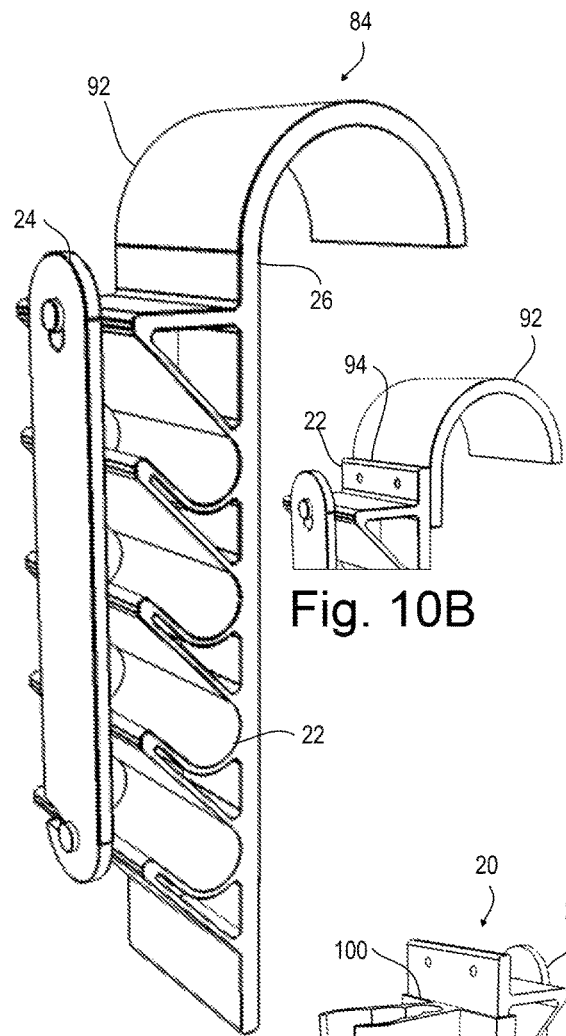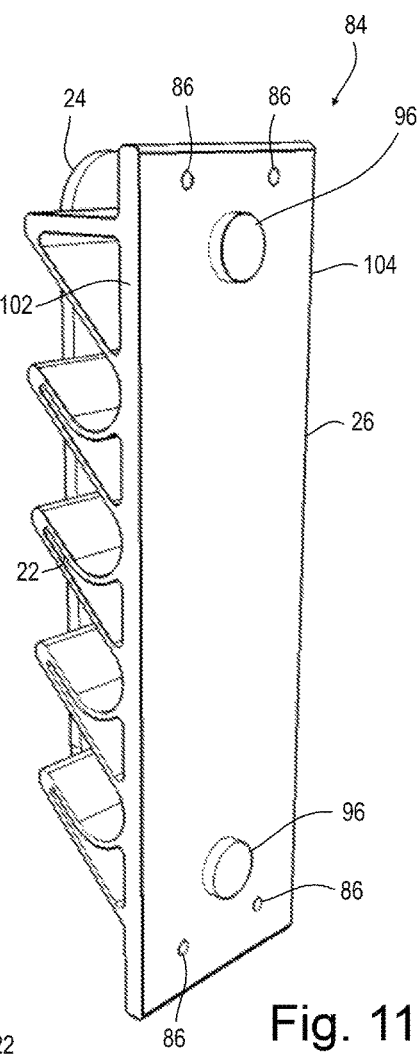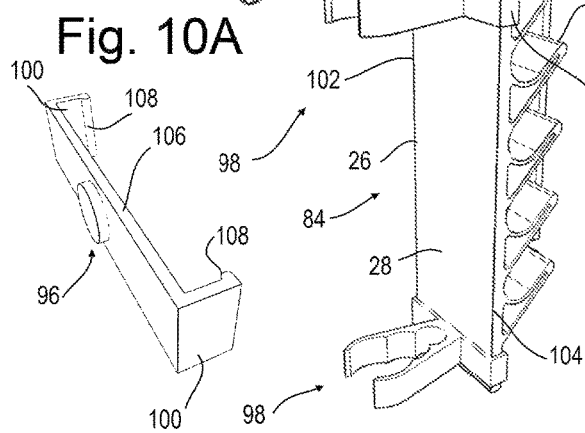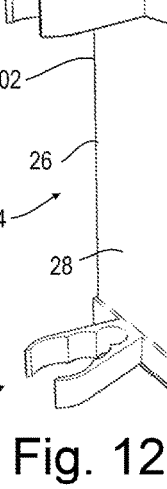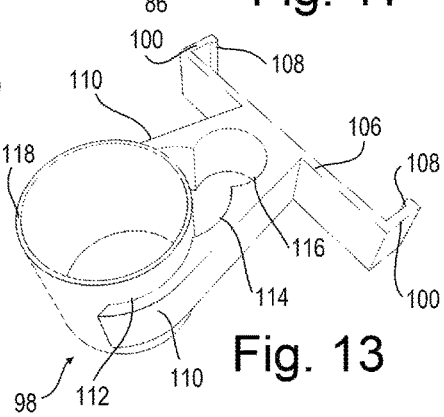

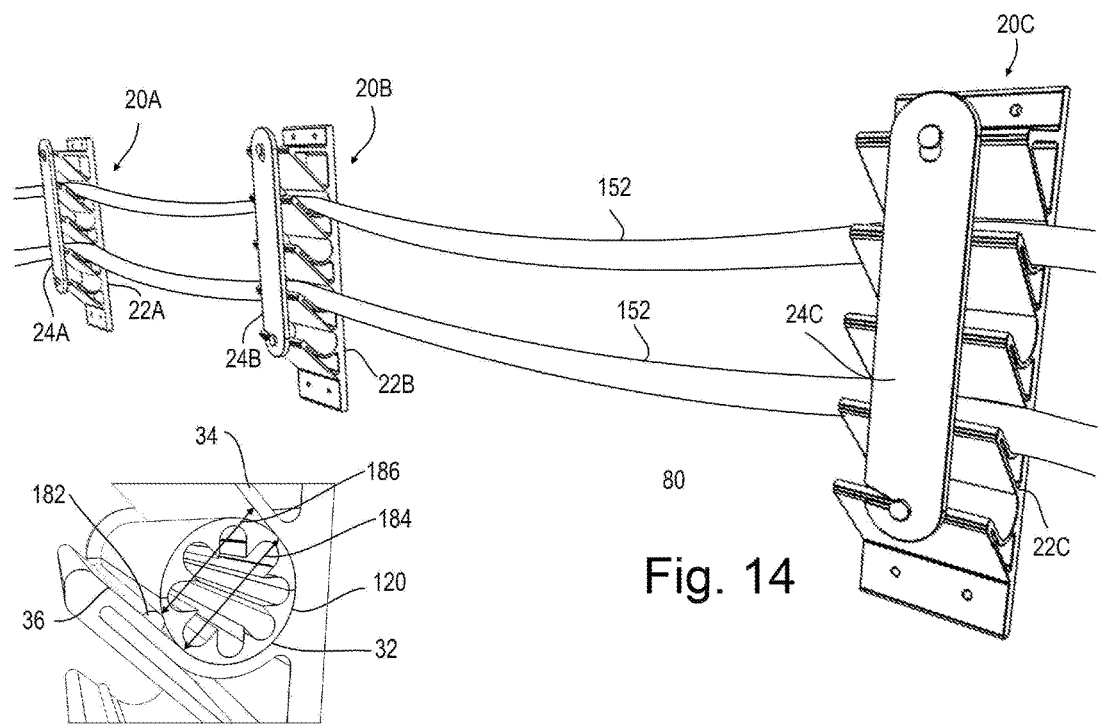
Fig. 14
Fig. 15
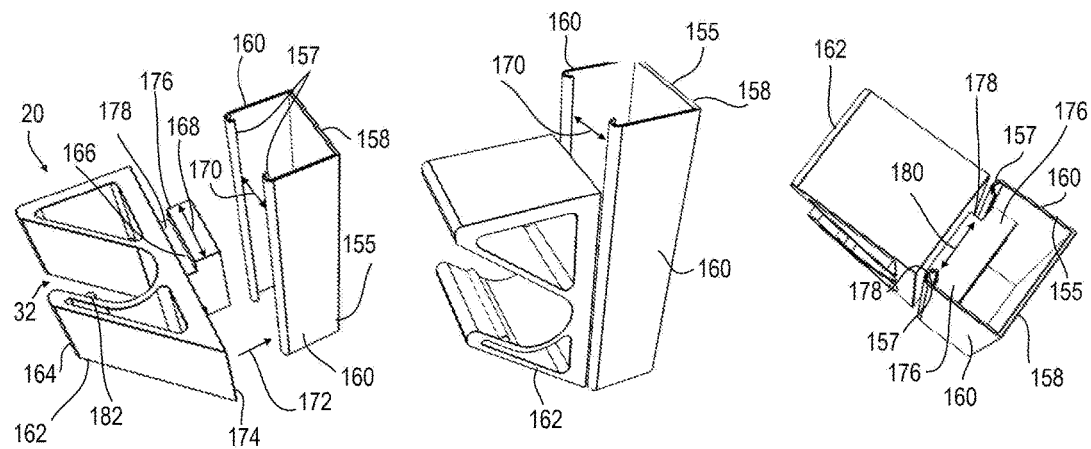
Fig. 16   Fig. 17   Fig. 18

POWER CORD CONTROLLER

RELATED APPLICATIONS

This application claims priority benefit of and is a Continuation In Part of U.S. Ser. No. 29/496,801, filed Jul. 17, 2014, incorporated herein by reference.

BACKGROUND OF THE DISCLOSURE

Field of the Disclosure

This disclosure relates to the field of apparatuses designed to be mounted to a support structure for the suspension and organization of power cords, data cables, hoses, tubing, conduit, and equivalents.

BRIEF SUMMARY OF THE DISCLOSURE

Disclosed herein is a cord control apparatus in one example comprising: a cord control rack comprising in turn: a substantially planar back plate; a surface defining a (at least two) cord receivers extending from a front surface of the back plate; each cord receiver having a concave cord resting surface; wherein each cord hook has an opening in a plane vertically above the cord resting surface; a mounting structure. The cord control apparatus in one example further comprising a cord retaining bar selectively positioned to cover the opening to each cord hook.

The cord control apparatus may further comprise: a cord retaining bar support protrusion having a cord retaining bar pivot; and a first end of the cord retaining bar pivotably attached to the cord retaining bar pivot.

The cord control apparatus may further comprise: a cord retaining bar catch; and a second end of the cord retaining bar selectively coupled to the cord retaining bar catch.

The cord control apparatus may be arranged wherein the mounting structure further comprises a plurality of surfaces defining fastener receivers through the back plate.

The cord control apparatus may be arranged wherein the mounting structure further comprises magnet fixed to the back plate.

The cord control apparatus may be arranged wherein the mounting structure comprises a downward opening hanging hook.

The cord control apparatus may further comprise a cord indexer having a plurality of cord indexing surfaces.

The cord control apparatus may be arranged wherein the cord indexer in hinged so as to open and allow cords to pass radially into cord indexing surfaces within the cord indexer.

BRIEF DESCRIPTION OF THE SEVERAL VIEWS OF THE DRAWINGS

FIG. 1 is a side isometric view of one example of the cord control apparatus.

FIG. 2 is a side view of the example shown in FIG. 1

FIG. 3 is a front isometric view of the example shown in FIG. 1 with the cord retaining bar removed to show other components.

FIG. 4 is a front isometric view of the example shown in FIG. 1 with the cord retaining bar repositioned to show a cord receiving position.

FIG. 5 is a detail exploded view of the apparatus with a cord indexer in place.

FIG. 6 is a detail exploded view of the cord indexer component shown in FIG. 5.

FIG. 6A is a detail view of another example of the cord indexer.

FIG. 6B is a detail view of yet another example of the cord indexer.

FIG. 7 is a detail exploded view of the apparatus with another example of a cord indexer in place.

FIG. 8 is a detail exploded view of the cord indexer component shown in FIG. 7 in a closed configuration.

FIG. 9 is a detail exploded view of the cord indexer component shown in FIG. 7 in a closed configuration.

FIG. 10A is a front isometric view of the example shown in FIG. 1 with a j-hook mounting component.

FIG. 10B is a front isometric view of the example shown in FIG. 1 with a j-hook mounting component attached thereto.

FIG. 11 is a rear isometric view of the example shown in FIG. 1 with a mounting component attached to the rear side of the cord control apparatus.

FIG. 11A is an isometric view of a clip-on mounting component.

FIG. 12 is a rear isometric view of the example shown in FIG. 1 with two mounting clips attached to the rear side of the cord control apparatus.

FIG. 13 is a front isometric view of the mounting clip component shown in FIG. 12.

FIG. 14 is an assembly view of several cord control apparatuses in use.

FIG. 15 is a detail view of the cord indexer component shown in FIG. 8 in use.

FIG. 16 shows the cord control apparatus with a different configuration and mounting structure attached to a.

FIG. 17 is a side isometric view of the cord apparatus of FIG. 17.

FIG. 18 is a top isometric view of the apparatus of FIG. 17.

DETAILED DESCRIPTION OF THE DISCLOSURE

Disclosed herein is a cord control system in several embodiments used to support, separate, and organize power cords. The term power cord intended to include: industrial grade power cords, cables, air hoses, open conduit including; vacuum hoses, oxygen hoses, welding leads, welding hoses, water hoses, data cables, cables, webbing, ropes, etc. For ease in description, the term "cord" will be utilized to indicate all of these structures and equivalents.

The cord control system 20 as described herein can be used at construction sites, manufacturing locations, industrial complexes, commercial properties, retail stores, temporary facilities, and trade shows, etc. as well as in the office, home, garage, workshop etc.

Using the cord control system 20 directly addresses three of the Occupational Safety and Health Administration (OSHA)'s typical top 10 violation areas including: fall protection. OSHA fall protection rules require safety plans identifying all hazards that might lead to a fall. The cord control system 20 described herein can be used to address the potential for slips and trips as well as the potential for electrifying scaffolds, ladders, and other metallic tools.

Electrical-wiring methods-freight wiring, loose connections, and poorly routed cords are hazards as well as damaging to productivity, profitability, and competitiveness.

Electrical-general requirements-according to OSHA, "working spaces, walkways, and similar locations shall be kept clear of cords so as not to create a hazard to employees," and, "extension cords should shall not be fastened with staples, hung from nails, or suspended by wire." As cords are suspended safely, and retained upon resting surfaces, working spaces are easily kept clear, and cords may be added and removed easily without wrapping.

The cord control system has been specifically designed to enhance workplace safety, optimize productivity, improved profitability, and maximize competitiveness by providing a safe, efficient and inexpensive apparatus to hold cords above floors, stairs, tools, and work surfaces.

The cord control system 20 as shown in the Figs. and optional cord retaining strap 24 secures and supports multiple cords of optionally varying types on a single cord control rack 22 with multiple cord receivers.

The cord control system 20 is designed as a part of a strategy to reduce injury claims, OSHA citations, and labor and industry (L & I) rate increases.

Utilizing the cord control system 20 will also prohibit unwanted movement and repositioning of cords which will reduce fraying or damage of those cords otherwise inflicted by job-site traffic. This reduction of damage saves time and money. In addition, the cord control system 20 increases productivity as installation and removal of cords on site is accomplished quickly and easily reducing labor time and expense.

In one example, the components of the cord control system 20 can be produced (cast) of high density polyethylene (HDPE) which may be recycled from other materials. In one example, the cord retaining rack including: resting surfaces, mounting structure, support webbing, cord retaining bar pivot, and cord retaining bar catch may be cast in a single process mold as a unitary body structure. The cord retaining strap may be cast as a second unitary body structure. When not attached to a support structure, the components of the cord control system 20 are easily carried and stowed.

The term unitary body used herein to define a structure which is cast as a single homogenous component without adhesives, fasteners, or welding.

The cord control system 20 provides a safer and more efficient workspace, in that cords are easily and quickly attached or detached from the cord control rack 22 and additionally, the cord control rack 22 is easily attached or detached from walls, ceilings, workbenches, fencing, and other support structures as will be more clearly discussed.

Looking to FIG. 1 is shown one example of the cord control system 20 including a cord control rack 22 with a cord retaining strap 24 movably attached thereto. The cord control rack 22 of this example having a back plate 26 with a rear surface 28 and a front surface 30. A plurality of cord receivers are provided, in this example including: a first cord receiver 32A, second cord receiver 32B, third cord receiver 32C and fourth cord receiver 32D. In other examples such as shown in FIG. 17, a single cord receiver may be utilized, and other combinations including two, three, five or more cord receivers may be utilized on a single back plate 26 or in a combination of back plates 26. Each cord receiver comprising an upper surface 34, a lower surface 36, and a cord resting surface 38 which is shown as concave arcuate for structural rigidity and to remove sharp corners which may fray or damage cords. Generally, each cord resting surface is in a plane vertically below and horizontally inward of the associated opening to the cord receiver. As shown, the first cord receiver 32A has an upper surface 34 supported on its outboard end 40 by a top protrusion 42 as well as a rigid web 44 which is installed or cast inside a triangle formed by the upper surface 34, top protrusion 42, and back plate 26.

This triangle formed by the upper surface 34, top protrusion 42, back plate 26, reinforced by the rigid web 44 provides a rigid and structurally sound support for a cord retaining bar support protrusion 46 which can more easily be seen in FIG. 3. As shown, the cord retaining bar support protrusion 46 comprises a cord retaining bar pivot section 48 which is of smaller diameter than the more forward portion 50. Looking to the cord retaining strap 24 shown adjacent to the cord control rack 22; is shown a keyway opening 52 having a large lower region 54 which allows passage of the forward portion 50. After passing the larger region 50, the cord retaining strap 24 may be repositioned downward so as to engage a small upper region 56 about the cord retaining bar pivot 48. In one form, the small upper region 56 is more than a half cylinder, and the smaller region adjacent the large lower region 54 is of slightly smaller diameter than the outer diameter of the cord retaining bar pivot 48.

When either of the cord control rack 22 or cord retaining strap 24 is made of a malleable material the small upper region 56 will snap fit onto the cord retaining bar pivot 48, thus holding the cord retaining strap 24 on to the cord control rack 22. As each cord receiver 32 has an opening 58 through which the cords are passed laterally and downward so as to rest upon the cord resting surfaces 38, the cord retaining strap 24 closes this opening 58 and prevents accidental removal of the cord from the cord control system 20.

In some applications, the cord retaining bar pivot 48 may be sufficient to hold the cord retaining strap 24 in position. In other examples such as shown in FIG. 1, a cord retaining bar catch 60 may be utilized in a similar manner to the cord retaining bar pivot 48 in that the cord retaining bar catch 60 has an inner portion 62 of a smaller diameter than an outer portion 64. Looking to FIG. 4 it can be seen that the cord retaining strap 24 is rotated to the right in direction of travel 66 so as to allow access to the third cord receiver 32C and forth cord receiver 32D. Further rotation of the cord retaining strap 24 in this opening direction 66 will allow access to the first cord receiver 32A and second cord receiver 32b. Rotation of the cord retaining strap 24 in a closing direction 68 will position a large outer region 70 of a catch opening 72 (on the second and 74 of the cord retaining strap 24) adjacent the inner portion 62 of the cord retaining bar catch 60. The catch opening 72 has a smaller diameter net 76 which opens to a small region 78 which may be only slightly larger in diameter than the inner portion 62 of the cord retaining bar catch 60. This arrangement provides a snap fit closure as the cord retaining strap 24 is repositioned to the closed position 80 shown in FIG. 1 and in FIG. 14. In this position, most cords will be substantially prohibited from being removed from the cord control system 20 until the cord retaining strap is repositioned or removed to the open position 82 as shown in FIG. 4.

A mounting structure 84 of several examples is also included for attachment of the cord control rack 22 to a support structure such as a ceiling, wall, frame, fence, post, machinery etc. FIG. 1 for example shows an example of the mounting structure 84 comprising a plurality of surfaces defining openings 86 through the back plate 26. Screws may be passed through these openings 86 and screwed or threaded into a support structure such as a wall, door, cabinet, machinery, post, etc. in other examples, U-bolts, wires, string, rope, hook and loop bands, zip ties or equivalent structures may be passed through adjacent surfaces defining openings 86, around a portion of a support structure such as a post and then tensioned to maintain the cord control system 20 in position. In this example, surfaces defining openings 86 are provided in the top end 88 and bottom end 90 of the cord control rack 22.

Looking to FIG. 10A is shown another example of the mounting structure 84 comprising a J-hook mounting component 92. This J-hook mounting component may rest upon the upper surface of a wall, door, railing, machinery, etc. and the cord control rack 22 will hang therefrom. In this example, the J-hook mounting component 92 is formed as a unitary body with the cord control rack 22. In the example shown in FIG. 10B, the J-hook mounting component 92 is attached by way of fasteners 94, adhesives, welding, hook and loop, or other structure to the cord control rack 22. In one form, the fastening structure allows removal of the J-hook mounting structure 92 to the cord control rack 22.

Looking to FIG. 11 is shown another example of a mounting structure 84 comprising a mounting component 96, or plurality of mounting components 96. The mounting components 96 may be magnets, adhesive (such as glue or tape for example), hook and loop fasteners, keyway catches, or equivalents.

Looking to FIGS. 12 and 13 is shown an example of the mounting structure 84 utilizing a mounting clip component 98 or plurality of mounting clip components 98. Each mounting clip component 98 has lateral wings 100 which can be removably attached to the left 102 and right 104 sides of the cord control rack 22. The mounting clip component 98 also has a cross member 106. The cross member 106 extends between the wings 100 on the rearward side thereof. The cross member 106 is generally in contact with the rear surface 28 of the cord control rack 22. In this example, the mounting clip component 98 also comprises a plurality of detents 108 which form a snap fit connection as they pass the left 102 and right 104 sides of the back plate 26 and engage the front surface 30 of the back plate 26.

In this example, the arms 110 of the mounting clip component 98 comprise a plurality of convex surfaces 112, 114, 116 which allow for attachment to support structures 118 of varying diameters. For example, in this configuration, the cord control system 20 may be attached to posts, conduit, piping, or similar substantially cylindrical structures having diameters slightly larger than each of the convex surfaces 112, 114, 116.

FIG. 11A shows an example where the mounting component 96 is not mounted directly to the back plate 26, but is attached to an attachment device similar to that shown in FIG. 13. The attachment device having a cross member 106, wings 100, and detents 108.

In some applications, it may be desired to lay multiple cords, for example computer data cables, in a single cord receiver 32. To index and separate these, several examples of a cord indexer 120 may be utilized. For example, looking to FIG. 5 is shown an external cord indexer 122 which generally comprises a convex cylindrical outer surface 124 with a plurality (three) cord indexing surfaces 126 on the exterior surface thereof. The convex outer surface 124 sits upon the cord resting surface 38 and a plurality of flanges 128 may be provided on either longitudinal and of the cord indexer 122 to maintain position of the cord indexer 122 upon the cord control rack 22. In this example, the cord indexing surfaces 126 are shown as generally U-shaped, although they may be closed inward at the radially outward portions 130 so as to more securely receive a cord in a loose snap-fit arrangement. Although in this example, three (3) cord indexing surfaces 126 are shown, each aligned with the horizontal axis 132 of the cord indexer 122, the apparatus may be used with 1, 2, 4, or more cord indexing surfaces 126 in varying arrangements such as shown in FIGS. 6A and 6B.

FIG. 7 shows another example of the cord indexer 120 being an internal cord indexer 134. The cord indexer 134 having a convex exterior surface 136 which rests upon the cord resting surface 38 and a plurality of flanges 138 on either longitudinal end thereof to maintain position of the cord indexer 122 upon the cord control rack 22. This example differs from the example shown in FIG. 6 in that a hinge 140 or plurality of hinges 140 are provided to allow and the first half 142 and second half 144 to open to the position shown in FIG. 9 allowing access to the interior 146 of the cord indexer 134. Example, the first half 142 and second half 144 may be formed of a polymer material allowing the hinges 140 to be formed as living hinges which may be a very thin portion of the polymer, allowing the two halves of the cord indexer 134 to the formed as a unitary body formed of a single casting step. As shown, this example of the internal cord indexer 134 comprises a plurality of eight (8) cord indexing surfaces 148. As with the previous example, although eight (8) cord indexing surfaces 148 are shown, each radially aligned with the horizontal axis 150 of the cord indexer 134 these indexing surfaces 148 may be of different arrangements and number depending on the application.

Looking to FIG. 14 is shown one example of the apparatus in use. In this example, a first cord indexing system 20A, a second cord indexing system 20B, and a third cord indexing system 20C are shown each sequentially supporting a single cord 152. Additional cords 152 may be similarly attached in other cord receivers in vertical alignment and separation allowing for easy installation, identification, and removal.

Looking to FIG. 15 is shown another example wherein a cord indexer 120 is positioned within a cord receiver 32 having a detent 154 or equivalent surface positioned on the lower surface 36. The detent 154 may alternatively be formed on the upper surface 34. In this example, the measured distance 156 of the wider, inner portion of the cord receiver 32 is substantially larger than the portion 158 perpendicular to the upper surface 34 at the detent 154. This detent arrangement may reduce or avoid the need for the cord retaining strap 24, as the cord indexer 120 or a cord having substantially the same diameter will effectively snap fit past the narrower region 158 into the wider region 156 and thus substantially prohibit removal without substantial force.

Looking to FIGS. 16-18 is shown another example of the cord control system 20 is adapted to be mounted to a strut channel 155.

Strut channel 155 is often referred to colloquially by one of several manufacturer trade names, (e.g. "G-STRUT", "Kindorf", "Unistrut", "SuperStrut", "UltraSTRUT", "Strut", "Metstrut", "Flexstrut", "JIKAstrut", "Nu-Strut", "Cantruss", "C-Channel"), is a standardized formed structural system used in the construction and electrical industries for light structural support, often for supporting wiring, plumbing, or mechanical components such as air conditioning or ventilation systems.

Strut channel 155 is often formed from metal sheet, folded over into an open channel shape with inwards-curving hooks 157 extending from sidewalls 160 to provide additional stiffness, and as a location to mount interconnecting components including this example of a cord control apparatus 162. Strut often has holes of some sort in the back wall 158, to facilitate interconnection or fastening strut to underlying building structures.

In US units, the basic typical strut channel forms a box 1⅝ inch by 1⅝ inch. In metric units, this is a 41 mm by 41 mm unit. There are several additional sizes and combined shapes manufactured.

To facilitate installation of the strut channel cord control apparatus 162, the cord control rack 164 of this example has a malleable T-block 166 formed (cast) therewith as a unitary body or attached thereto by fasteners, adhesives, etc. The malleable T block 166 has a height 168 equivalent to or less than the width of a gap 170 between the hooks 157 of the strut channel 155 to allow easy passage there between. This sizing and malleability allows the cord control apparatus 162 to be rotated onto its side as shown in FIG. 16, repositioned horizontally 172 until the rear surface 174 of the cord control apparatus 162 contacts the forward side of the sidewalls 160 and the malleable T-block 166 has substantially passed the hooks 157. The cord control apparatus 162 may then be rotated to the orientation shown in FIG. 17 such that the wings 176 of the malleable T-block 166 engage the rearward portion of the hooks 157 and the majority of the hooks 157 fit within channels or recesses 178 formed by the wings 176 of the malleable T-block 166 and the rearward surface 174 of the cord control apparatus 162. The width 180 between the channels 178 may be slightly larger than the gap 170 between the hooks 157 to provide a friction fit there between. Alternatively or in addition, the depth of the channels 178 may be less than the depth of the hooks 157 to form a friction fit. Either arrangement allows relatively fixed positioning of the cord control apparatus 162 on the strut channel 155.

In this example of the cord control system 20, only a single cord receiver 32 is utilized, although multiple cord receivers 32 may be utilized as shown in FIG. 1. In addition, the arrangement utilizing a detent 154 has been shown rather than the cord retaining strap 24. Other combinations of these and other components are conceived.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The invention claimed is:

1. A cord control apparatus comprising:
  a. a cord control rack comprising:
    i. a substantially planar back plate lying in a vertical plane when installed onto a support structure;
    ii. a plurality of protrusions extending at an angle horizontally forward of and vertically upward from a front surface of the back plate;
    iii. the protrusions and back plate defining a plurality of cord receivers;
    iv. each cord receiver having a concave cord resting surface;
    v. wherein each cord hook has an opening in a plane vertically above the cord resting surface when the cord control rack is installed onto a vertical support structure;
    vi. a mounting structure fixed to a rear surface of the back plate;
  b. a cord retaining bar fixed to an uppermost protrusion via a pivot such that the cord retaining bar rotates in a plane parallel to the back plate;
  c. a cord retaining bar catch fixed to a protrusion vertically below the uppermost protrusion and configured to prohibit rotation of the cord retaining bar about the pivot when the cord retaining bar is engaged thereto;
  d. the cord retaining bar selectively positioned to cover the opening to each cord hook.

2. The cord control apparatus as recited in claim 1 further comprising:
  a. a cord retaining bar support protrusion having a cord retaining bar pivot; and
  b. a first end of the cord retaining bar pivotably attached to the cord retaining bar pivot.

3. The cord control apparatus as recited in claim 1 further comprising:
  a. a cord retaining bar catch; and
  b. a second end of the cord retaining bar selectively coupled to the cord retaining bar catch.

4. The cord control apparatus as recited in claim 1 wherein the mounting structure further comprises a plurality of surfaces defining fastener receivers through the back plate.

5. The cord control apparatus as recited in claim 1 further comprising a cord indexer removably inserted into a cord receiver, the cord indexer having a plurality of cord indexing surfaces.

6. The cord control apparatus as recited in claim 5 wherein the cord indexer in hinged so as to open and allow cords to pass radially into cord indexing surfaces within the cord indexer.

7. A cord control apparatus comprising:
  a. a cord control rack comprising:
    i. a substantially planar back plate lying in a vertical plane when installed onto a support structure;
    ii. a surface defining at least two cord receivers extending from a front surface of the back plate;
    iii. each cord receiver having a concave cord resting surface;
    iv. wherein each cord hook has an opening in a plane vertically above the cord resting surface when the cord control rack is installed onto a support structure;
    v. a mounting structure fixed to a rear surface of the back plate;
  b. a cord retaining bar selectively positioned to cover the opening to each cord hook; and
  c. wherein the mounting structure comprises a downward opening hanging hook.

* * * * *